United States Patent [19]
Takasu et al.

[11] Patent Number: 5,727,216
[45] Date of Patent: Mar. 10, 1998

[54] SIGNAL PROCESSOR

[75] Inventors: Akira Takasu; Katsuhide Sakai, both of Toyokawa, Japan

[73] Assignee: Minolta Co., Ltd., Osaka, Japan

[21] Appl. No.: 498,798

[22] Filed: Jul. 6, 1995

[30] Foreign Application Priority Data

Jul. 8, 1994 [JP] Japan ................................. 6-157660

[51] Int. Cl.$^6$ ....................................................... G06F 9/46
[52] U.S. Cl. ............................ 395/733; 364/574; 371/62
[58] Field of Search ............................. 371/62; 364/574; 395/733

[56] References Cited

U.S. PATENT DOCUMENTS

| | | |
|---|---|---|
| 4,550,382 | 10/1985 | Federico et al. |
| 4,631,683 | 12/1986 | Thomas et al. ........................... 371/62 |
| 5,018,342 | 5/1991 | McClure et al. ........................... 371/62 |

Primary Examiner—Jack B. Harvey
Assistant Examiner—David A. Wiley
Attorney, Agent, or Firm—Burns, Doane, Swecker & Mathis, LLP

[57] ABSTRACT

A signal processor having excellent noise resistance characteristics while maintaining superior synchronizing characteristics for hardware interrupt processes. Signal A output from a port REM of a high order CPU is input in parallel as signals B and C to an interrupt port INT of a motor drive control CPU, and to a normal input port Pi, respectively. Timers x and y are started at the same time as interrupt signal B falls, timer y counts up to time Y before time X set by timer x, and at that time a determination is made as to whether or not signal C input to port Pi and signal B input to port INT are identical. If signals B and C are identical, they are normal input signals, and pulse signals are output from ports P0–P3 after time X elapses. If signals B and C are different, a pulse signal is not output from the ports P0–P3.

6 Claims, 5 Drawing Sheets

SIGNAL PROCESSOR

BACKGROUND OF THE INVENTION

1. Field of the Invention

The present invention relates to a signal processor using an interrupt port of a central processing unit (CPU), and specifically relates to a signal processor having excellent noise resistance characteristics.

2. Description of Related Art

In conventional signal processors which output specific output signals after the passage of a predetermined time interval in accordance with input signal from an external device, interrupt processes are executed in hardware or software when synchronization with the input of signals is required. Hardware interrupt processes, which execute an interrupt process based on input signals from an external device, are used to fetch input signals when input signals change (rise or fall), and there are times when it may not be able to discriminate whether the change in the input signal is a change in the normal input signal or a temporary signal level change due to noise.

Hardware interrupt processes allow extremely good synchronizing characteristics, but conversely have extremely poor noise characteristics and may fetch noise. Countermeasures have been proposed, such as isolation methods and the like using optical semiconductors, and filter circuits such as band-pass and low-pass filters using a storage effect.

Conventional noise countermeasures present certain disadvantages insofar as synchronizing characteristics are reduced at the same time noise resistance is improved.

FIG. 7 shows the construction of a conventional noise countermeasure. FIGS. 7(A) and 7(B) show circuit for input signals, and FIG. 7(C) illustrates the input signal waveforms of the interrupt pin INT for each said circuit.

FIG. 7(B) shows a circuit wherein signal D1 is input directly to interrupt pin INT of CPU 21. The noise associated with the circuit in FIG. 7(B) is eliminated in the circuit in FIG. 7(A) because the signals D2 input to interrupt pin INT of CPU 21 pass through a filter circuit comprising resistor 221 and capacitor 212.

FIG. 7(C) shows the signal levels of signals D1 and D2 input to the circuits shown in FIGS. 7(A) and 7(B). Referring now to FIG. 7(C), signal D1, which does not pass through a filter, falls sharply from high (H) level to low (L) level at time t11; but signal D2, which does pass through a filter, starts to fall at time t11 and said fall ends completely at time t12. That is, in the case of signal D2, an interrupt signal input to the interrupt port passes through a filter, such that the signal input to the port is relatively slowly changed compared to signal D1. Heretofore, the change in the signal from high level to low level has been suitably detected by CPU 21 at time t11, however, the detection of the switch from high level to low level is now first detected at time t12. As a result, when various devices are controlled synchronously with the input of input signal D2, a delay ensues during the interval from t11 to t12 only. This delay reduces synchronizing characteristics by 5–10 ms in terms of specific numeric values.

SUMMARY OF THE INVENTION

An object of the present invention is to eliminate the previously described disadvantages by providing a signal processor having excellent noise resistance characteristics while maintaining superior synchronizing characteristics in hardware interrupt processes without preprocessing of interrupt signals prior to input to the interrupt port of the CPU.

The aforesaid objects of the present invention are accomplished by providing a signal processor comprising: an interrupt port which inputs external signals; an input port which in parallel inputs said external signals input to said interrupt port; a timer which starts to time a predetermined time interval by signal input to said interrupt port; a storage device which stores signals input to said interrupt port; a discrimination device which discriminates whether or not signals stored in said storage device are identical to signals input to said input port within said predetermined time interval; and a control device which controls the execution of a predetermined process after the passage of said predetermined time interval so as to allow or prevent said process execution in accordance with the results of said discrimination by said discrimination device.

According to the signal processor of the aforesaid construction, a signal is simultaneously input in parallel to an interrupt port and an input port, and the discrimination device determines whether or not the signal input to the input port and interrupt port are identical within a predetermined time interval. If the signal input to the interrupt port is noise, the signal converges within said predetermined time interval. Therefore, the discrimination device determines whether or not the signal is noise, and a predetermined process is executed only when noise is absent after said predetermined time interval in accordance with the discrimination results.

Thus, the present invention provides a signal processor having excellent noise resistance characteristics while maintaining superior synchronizing characteristics during hardware interrupt processes without errors in a subsequent operation due to noise by discriminating a proper signal from noise.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1:
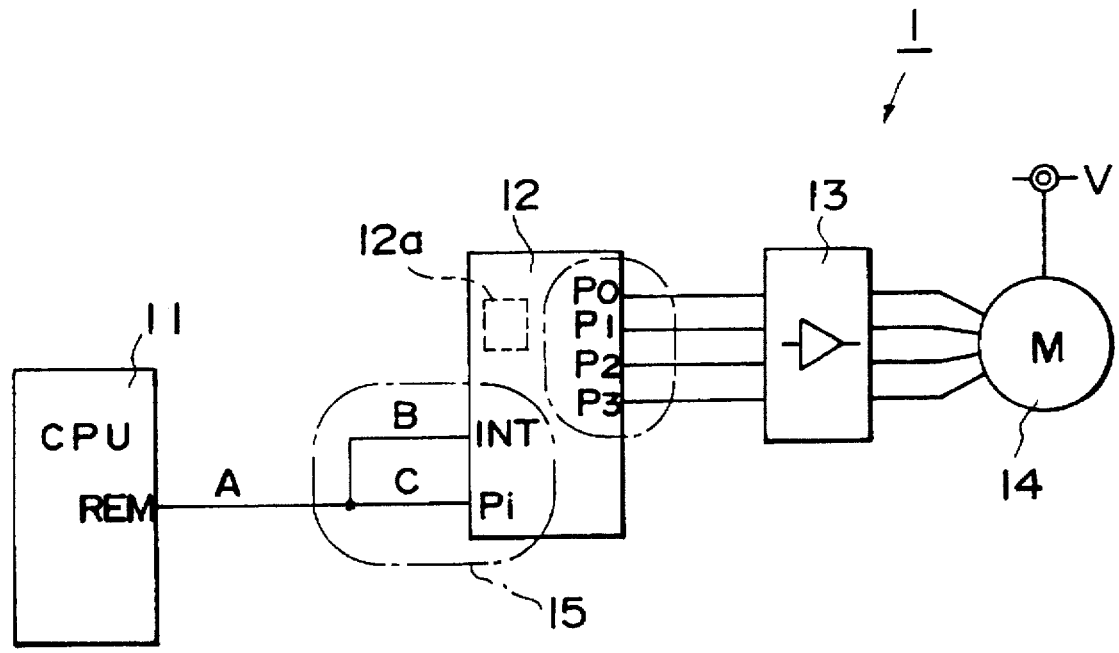
FIGS. 1(A) and 1(B) are block diagrams showing the essential parts of the signal processor of the present invention.
Figure 1:
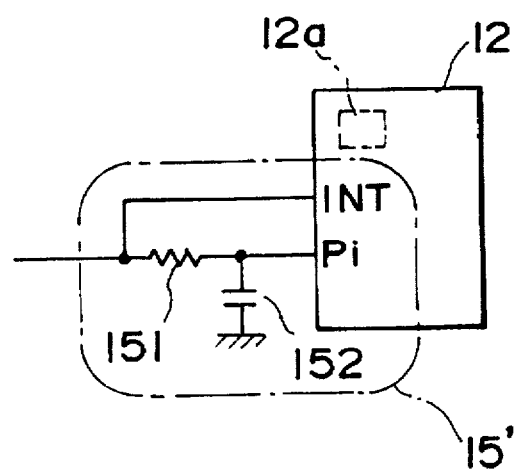

The preferred embodiments of the present invention are described hereinafter with reference to the accompanying drawings. FIG. 1(A) is a block diagram showing the essential part of signal processor 1 of the present invention. Referring now to FIG. 1(A), the signal processor of the present invention comprises a CPU 11 which is in a high order relationship so as to output a control signal A from an output port REM, and a CPU 12 connected to the CPU 11. The CPU 12 is provided for controlling a pulse motor 14, and therefore, outputs control signals from output ports P0–P3 to a driver IC 13 which drives the pulse motor 14 in accordance with the control signal A output from the CPU 11. The pulse motor 14 is connected to a power source V.

The CPU 11 outputs the control signal A from the output port REM. When the signal A output changes, the signal A is input in parallel to an interrupt port INT of the CPU 12 used for motor drive control and to a normal input port Pi as signals B and C, respectively. The motor drive control CPU 12, after executing a process described later, outputs from output ports P0–P3 pulse signals suitable to the motor drive control data so as to drive the pulse motor 14. The pulse signal reaches the driver IC 13, such that pulse motor 14 is driven at a pulse rate in accordance with the pulse signal. The output pulse signals (P0, P1, P2, P3) are output, for example, as numerical values (0, 1, 1, 0).

FIG. 1(B) shows modification 15' of section 15 circumscribed by the dashed line in FIG. 1(A). In this modification, a filter circuit is provided in front of the normal input port Pi to improve the noise resistance of signal processor 1. FIG. 1(B) is described in detail later.

Figure 2:
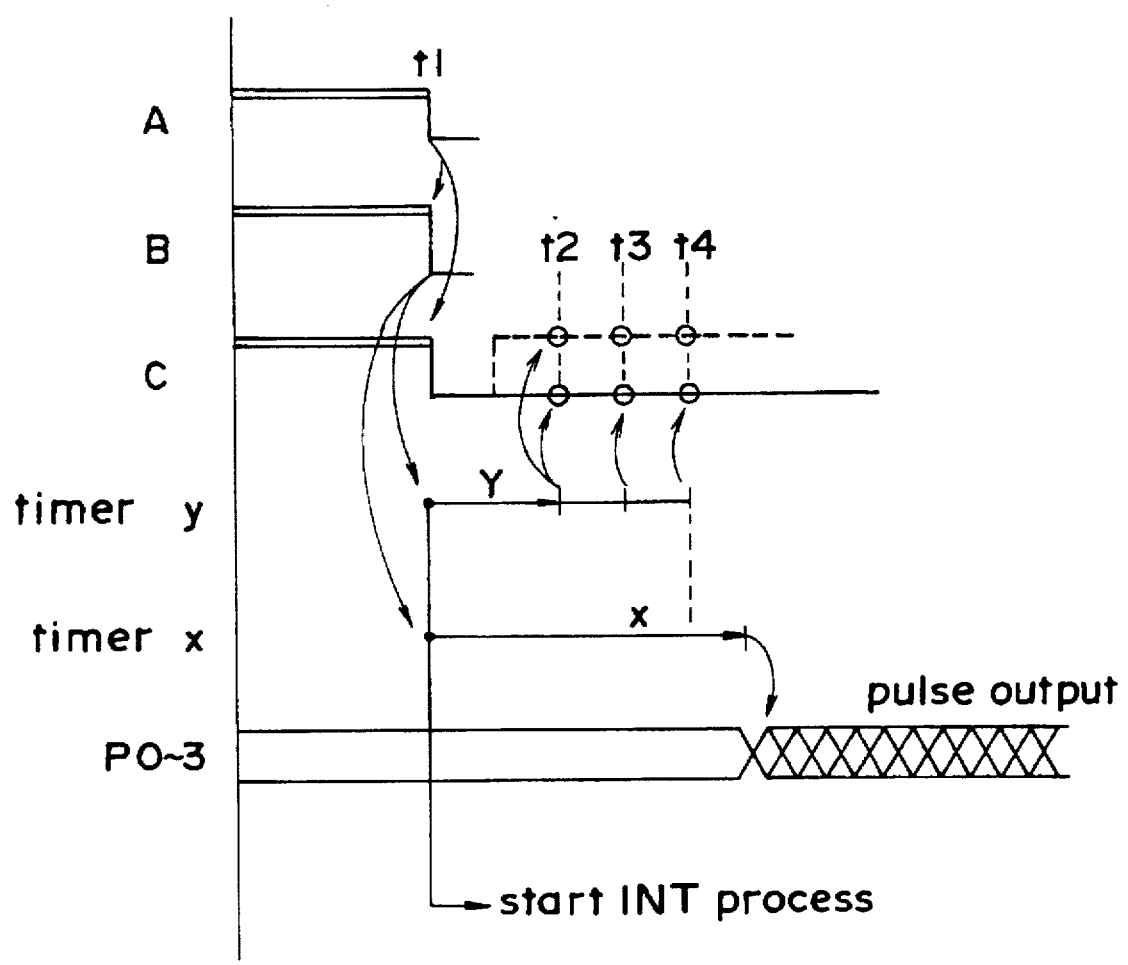
FIG. 2 is a timing chart for the signal processor of the present invention.

The operation of the signal processor of the present invention is described specifically below with reference to FIG. 1(A) and FIG. 2. FIG. 2 is a timing chart showing the values of input/output signals and the timing of timers which operate in accordance with the value of an input signal.

When the output of signal A from the port REM changes at time t1, the signal A is simultaneously input to the interrupt port INT and to the normal input port Pi as signals B and C, respectively. In the present embodiment, pulse signals are output from output ports P0–P3 after a predetermined time X following the output change of the signal A so as to start driving the pulse motor 14. That is, the synchronizing characteristics are preset so as to start driving pulse motor 14 after a predetermined time X from the output of a drive start command signal for pulse motor 14.

The change of the signal B in the interrupt port INT triggers the simultaneous start of timers x and y as an interrupt process, as shown in FIG. 2. After the count value of timer x attains a count value of X, pulse signals are output from output ports P0–P3. When the signal B is input to interrupt port INT, the program currently being processed at the time of input by motor drive control CPU 12 is interrupted, and the timers x and y are started. Accordingly, there is no delay in time from the point of change in the signal A output from the output port REM to the start of the timers x and y.

For example, without using the aforesaid construction, if timers x and y are started after the input signal C to the normal input port Pi is checked, the motor drive control CPU 12 must jump from the program step currently being processed to a program for starting timers x and y at the time signal C falls. Thus, because check signal C input to normal input port Pi is checked at this time, a time difference occurs between the time of the actual signal change and the time the signal change is checked. This timing differential occurs between the change of the signal A and the start of the timer x. When such a timing differential occurs, the previously mentioned synchronizing characteristics are lost. Therefore, in the present embodiment, the previously described interrupt process is executed.

Referring now to FIG. 2, when the timers x and y are started, the timer y counts only a count value Y which is less than the count value X of the timer x. When the timer y counts up to Y, a check is made of the value of signal C of normal input port Pi.

As previously described in terms of the conventional art, when noise encroaches on the signal line of signals A and B, said noise may be erroneously detected as an output change of signal A by interrupt port INT. In order to avoid the aforesaid occurrence, a filter is provided in front of the interrupt port INT as previously described in terms of the conventional art, so as to reduce the affects of the noise. This method, however, is disadvantageous insofar as a delay of 5–10 ms occurs due to the filter, with the result that a delay occurs from the change in signal A output until the start of timers x and y.

In the present invention, the time y is started simultaneously with the start of the timer x, and after the timer y counts up to the value Y (after time t2), a check is made to determine whether or not the signal C input to the normal input port Pi and the signal B input to the interrupt port INT at the time when timer x is started (time t1) are identical. That is, if the signal is normal signal, the value of signal B input to interrupt port INT at time t1 can be expected to be the same as the signal input to port Pi at time t2. If the signal B is only noise, the noise converges until count value Y is attained, and the value of signal C at time t2 is different from that of signal B at time t1. Using this characteristic, the signal can be discriminated as noise or a normal signal.

The signal at time t1 is stored at a predetermined address of RAM 12a in CPU 12, so that the stored contents can be compared to the signal C.

As shown in FIG. 2, the signal C is verified by executing a plurality of checks of the signal C input to normal input port Pi when the timer y counts up to Y, the execution being at intervals of about 5 ms (t2, t3, t4 in FIG. 2). When signal C input to normal input port Pi has been verified by being checked a plurality of times and found to be identical each time, this signal is verified as either high level (H) or low level (L). In the example shown in FIG. 2, a normal signal is verified as low level (L). The verified signal C is compared to signal B at time t1.

When signal B at time t1 and signal C after count Y has elapsed are found to be identical, the signal B input to interrupt port INT at time t1 is based on the change of output of signal A, and pulse signal output is allowed from output ports P0–P3. On the other hand, when signals B and C are judged to be different, signal B input to interrupt port INT at time 1 is determined to be noise, and pulse output from output ports P0–P3 is prevented.

Figure 3:
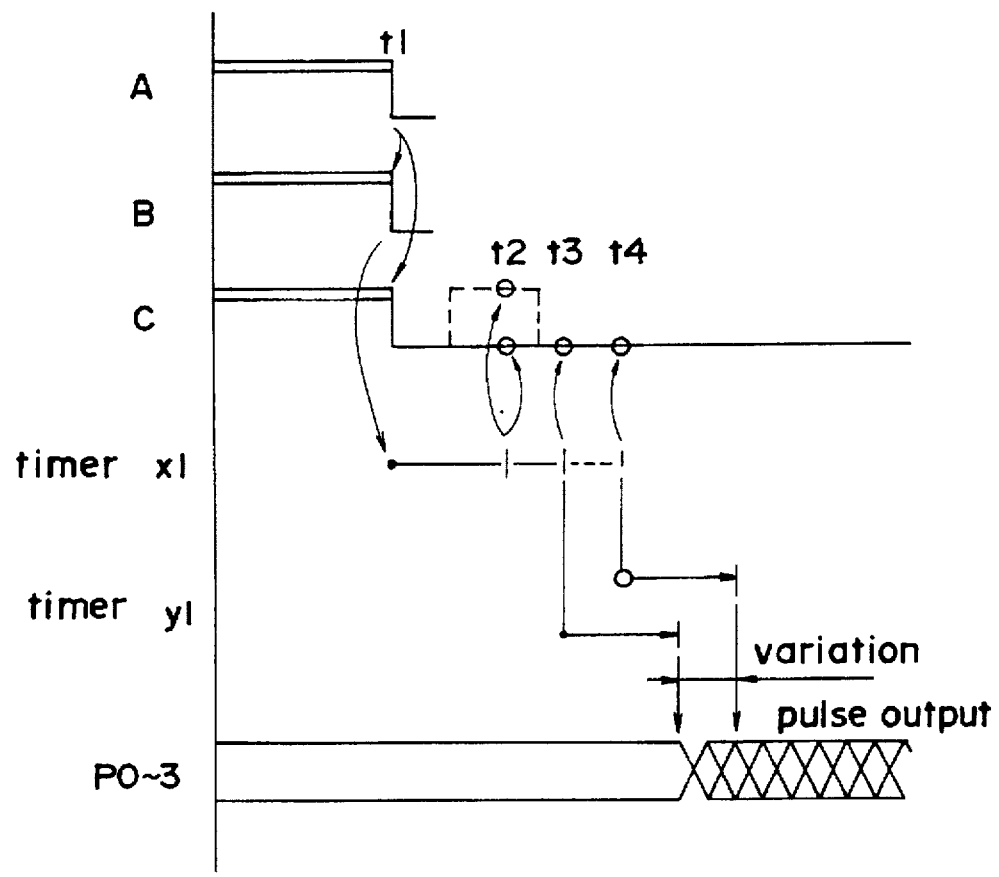
FIG. 3 is a timing chart showing a reference example of signal processing by a signal processor.

In order to clarify the characteristics of the present invention, noise countermeasures will be described below by way of reference examples wherein synchronizing is not verified, as shown in FIG. 3.

The change of signal B input to interrupt port INT at time t1 acts as a trigger to start timer x1, and after timer x1 counts up (time t2), the value of the signal C input to normal input port Pi is checked at time t3 or t4 to verify the signal input to normal input port Pi. A check is made to determine whether or not signal C input to normal input port Pi is identical to the value of signal B input to interrupt port INT when timer x1 starts. When signals B and C are identical, timer y1 is started, and after timer y1 counts up, pulse signals are output from output ports P0–P3; whereas when said signals B and C are different, timer y1 is not started, and the output change of signal B input to interrupt port INT at time t1 is discriminated as noise, such that a pulse signal is not output.

In the aforesaid processing method, the signal input to normal input port Pi is verified when timer x1 counts up, such that a delay in signal verification occurs at, for example, time t3 or time t4 due to the timing of the input signal. The timing for inputting signals produces a variation in timing between actual signal input and the step for checking the signals executed by CPU 12 at some point in time. As a result, after a predetermined time specified by timer y1 following signal verification, a delay of 5–10 ms occurs in the output timing of the pulse signals output from output ports P0–P3.

Although consideration is given to changes in the count value of counter y1 when the signal content is verified at time t3 and when signals are verified at time t4, control is difficult because the interval between t3 and t4 is short as 5–10 ms, which is less than the time of one cycle of motor drive control CPU 12.

In the present embodiment of the invention, synchronizing timer x is provided to precisely set the time from the signal change until the pulse signals are output by output ports P0–P3 with the change of signal B input to interrupt port INT acting as a trigger for the timer x. While the timer x is operating, the checking the signal C of normal input port Pi and comparing said signal with signal B at time t1 are executed. Therefore, the time delay as shown in the example of FIG. 3 is avoided.

Figure 4:
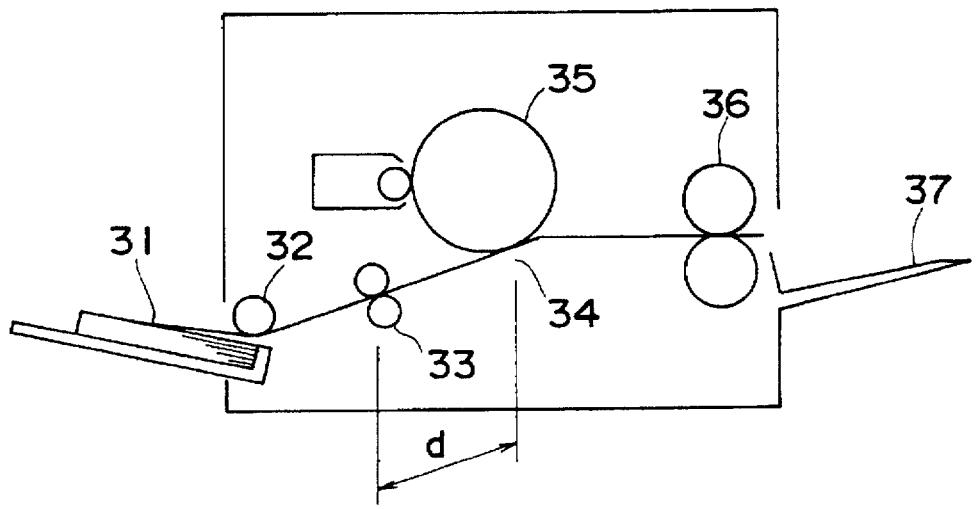
FIG. 4 briefly shows the construction of the essential part of a PPC copying apparatus.

An example of the signal processor of the present invention used to control the drive motor of a timing roller of a PPC copying apparatus is described hereinafter. First, the construction of the copying apparatus is described below. FIG. 4 shows the essential part of the paper supply section of the copying apparatus. Referring now to FIG. 4, the copying apparatus paper supply section includes a paper feed tray 31, and a pick-up roller 32 for feeding the copy sheets on the tray 31 to registration roller 33. A copy sheet fed to the registration roller 33 is held until the registration roller 33 is started by a start command from a controller or the like not shown in the illustration. A copy sheet transported by registration roller 33 comes into contact with a photosensitive member 35 in transfer section 34, and a toner image formed on the photosensitive member 35 is transferred onto the copy sheet. Thereafter, the toner image is fixed onto the copy sheet by fixing roller 36, and the copy sheet is discharged to a discharge tray 37. The registration roller 33 may be controlled by a clutch or motor; the motor method is used in the present embodiment.

Figure 5:
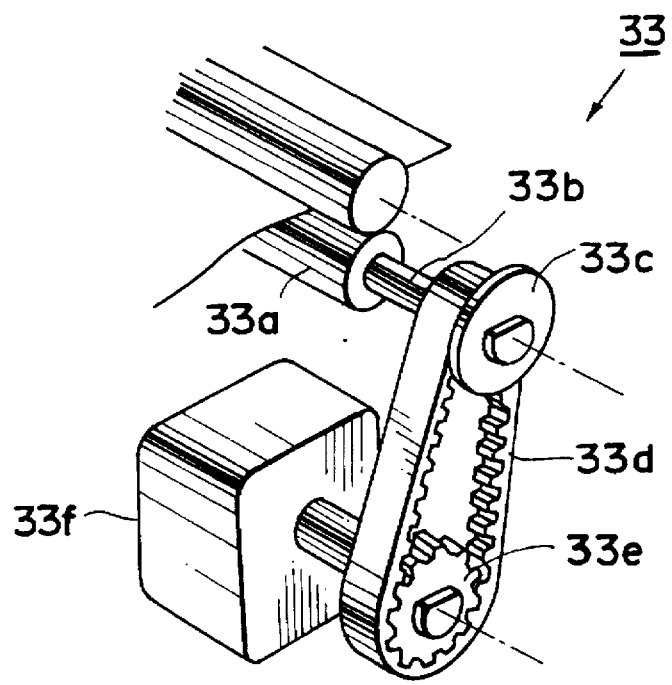
FIG. 5 shows the drive section of the registration roller.

FIG. 5 shows the essential part of registration roller 33. Referring now to FIG. 5, registration roller 33 includes a drive shaft 33b for driving a registration roller body 33a, a driven pulley 33c connected to the drive shaft 33b, a drive pulley 33e for driving the driven pulley 33c via a belt 33d, and a drive motor 33f for driving the drive pulley 33e. The drive motor 33f is driven by drive commands from the control unit (not illustrated) and is described below.

Figure 6:
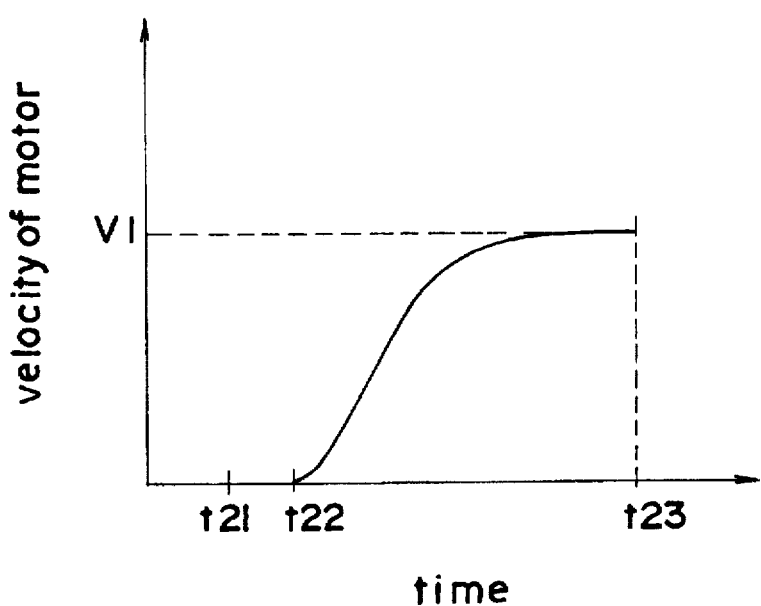
FIG. 6 is an illustration showing the drive characteristics of the registration roller.
Figure 7A:
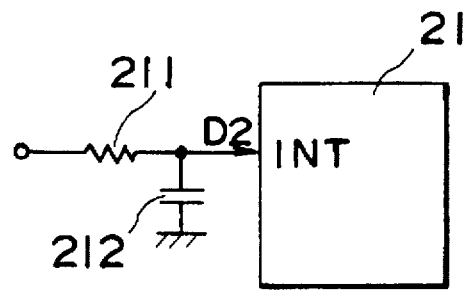
FIGS. 7(A) and 7(B) illustrate conventional constructions.
Figure 7B:
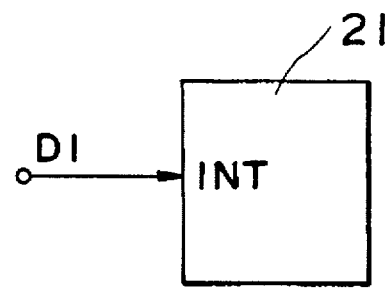
Figure 7C:
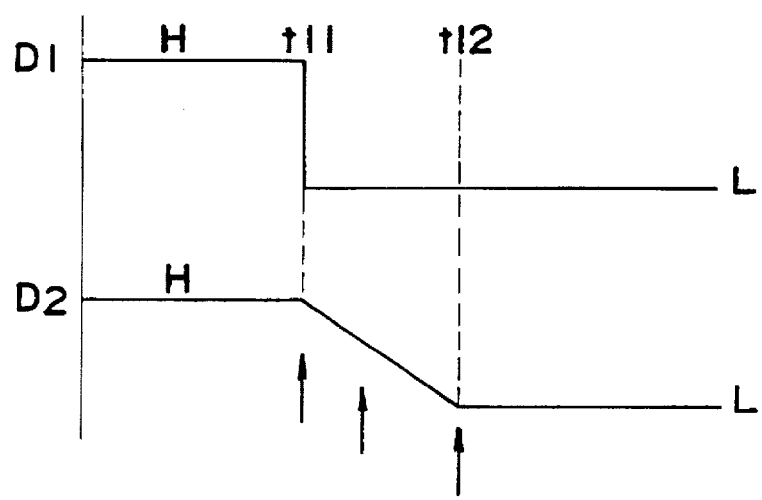
FIG. 7(C) shows the signal waveforms of said conventional constructions.

FIG. 6 shows the drive conditions of the registration roller 33. In the drawing, the horizontal axis represents time, and the vertical axis represents drive motor velocity. Referring now to FIG. 6, a drive start command is output for drive motor 33f at time t21, and the drive starts at time t22. Thereafter, the motor speed accelerates and attains a speed V1 which is peripheral speed of the photosensitive member 35. Reference d represents the distance from registration roller 33 to transfer section 34 in FIG. 4. The peripheral speed of photosensitive member 35 is designated V1, and the distance from the present position of the leading edge of the toner image to transfer section 34 is designated d1. The average speed during the time interval from t22 to t23 is designated V. At this time, a drive command for registration roller 33 is output when the following conditions are satisfied.

$$(t22 - t21) + \frac{d}{V} = \frac{d1}{V1}$$

In general, the peripheral speed of photosensitive member 35 is 400 mm/sec. When using a construction such as that of the reference example shown in FIG. 3, a delay of 5–15 milliseconds occurs between the issuance of the drive start command and the actual drive start, thereby producing a 2–6 mm dislocation between the leading edge of the copy sheet and the leading edge of the toner image. In a construction using a filter on the interrupt pin as described in the conventional example, a dislocation of 2–4 mm is produced. In contrast, when the construction of the present invention shown in FIG. 2 is used, the aforesaid dislocation does not occur.

In a typical PPC copying apparatus, it is desirable that the dislocation between the leading edge of the toner image and the leading edge of the copy sheet is within 1.5 mm as a standard.

The provision of a filter in front of normal input port Pi, as shown in FIG. 1(B), is described hereinafter. The filter is a low-pass filter comprising resistor 151 and capacitor 152. According to this construction, the change of the signal input to normal input port Pi is attenuated. However, the timer x is started in accordance with signal input to the interrupt port INT, and after the timer x counts up to X, the pulse motor 14 starts, such that there is no bad effect on synchronizing characteristics. Provision of a filter can eliminate noise entering the normal input port.

For example, when a voltage of about 600 V is applied to a ferrite core and the ferrite core is disposed adjacent to leads within a circuit, eddy current as noise is generated in the circuit leads, which affects other circuits. When a test is made to check noise resistance to determine whether or not erroneous operation of the circuit occurs in the aforesaid state of the construction having a filter as previously described, it is possible to achieve normal operation without errors because the filter eliminates the noise even if the signal input to input port Pi is a voltage signal of about 50 V.

Thus, synchronizing characteristics are maintained for a predetermined operation in accordance with an interrupt signal, just as in the construction of FIG. 1(A). And further, noise in signal input to the normal input port is eliminated by providing a filter in front of normal input port Pi.

Although the signal processor of the present invention has been described by way of a copying apparatus, it is to be understood that the present invention may be applied to devices using a CPU other than a copying apparatus.

Obviously, many modifications and variation of the present invention are possible in light of the above teachings. It is therefore to be understood that within the scope of the appended claims, the invention may be practiced other than as specifically described.

What is claimed is:

1. A signal processor comprising:
   an interrupt port which inputs external signals;
   an input port which in parallel inputs said external signals input to said interrupt port;
   a timer which starts to time a predetermined time interval by signal input to said interrupt port;

a storage device which stores signals input to said interrupt port;

a discrimination device which discriminates whether or not signals stored in said storage device are identical to signals input to said input port within said predetermined time interval; and a control device which controls the execution of a predetermined process after the passage of said predetermined time interval so as to allow or prevent said process execution in accordance with the results of said discrimination by said discrimination device.

2. A signal processor as claimed in claim 1, further comprising a second timer which starts to time a second predetermined time interval that is shorter than the predetermined time interval by signal input to said interrupt port, and wherein said discrimination device operates after the passage of said second predetermined time interval.

3. A signal processor as claimed in claim 2, further comprising a filter circuit which eliminates noise that is in the signal input to said input port.

4. A signal processor as claimed in claim 1, further comprising a filter circuit which eliminates noise that is in the signal input to said input port.

5. A signal processing system, comprising:

a central processing unit having an interrupt port, said central processing unit functioning to execute a program and, in response to receipt of an input signal at said interrupt port, interrupt the execution of the program to perform a predetermined process associated with the input signal;

a delay timer for delaying the performance of said process a predetermined period of time after receipt of an input signal at said interrupt port;

an input port connected in parallel with said interrupt port, for receiving the input signal applied to said interrupt port;

a discriminator for determining whether the signal received at said input port during said predetermined period of time is the same as the signal received at said interrupt port at the beginning of said predetermined period of time; and a control device for inhibiting the performance of said process when said discriminator determines that the signals at the respective ports are not the same.

6. A method for handling interrupts in a signal processing system, comprising:

executing a program in the signal processing system;

detecting receipt of an input signal at an interrupt terminal;

interrupting the execution of the program in response to the receipt of the signal at the interrupt terminal and performing a predetermined process while the execution is interrupted;

delaying the performance of the process for a predetermined period of time after the input signal is detected;

comparing the signal detected at said interrupt terminal to a signal received at an input port, which is connected in parallel to said interrupt terminal, during said predetermined period of time; and inhibiting the performance of said process when the compared signals are not the same.

* * * * *